United States Patent
Büsing et al.

(10) Patent No.: US 8,356,497 B2
(45) Date of Patent: Jan. 22, 2013

(54) HYDRAULIC CONNECTING ELEMENT OF A WATER-CONDUCTING DOMESTIC APPLIANCE

(75) Inventors: Johannes Büsing, Emersacker (DE); Werner Enderle, Günzburg (DE); Peter Geissler, Holzheim (DE); Cengiz Kücük, Syrgenstein (DE); Pedro Sancho, Saragossa (ES)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 493 days.

(21) Appl. No.: 12/673,601

(22) PCT Filed: Aug. 22, 2008

(86) PCT No.: PCT/EP2008/061024
§ 371 (c)(1),
(2), (4) Date: Feb. 16, 2010

(87) PCT Pub. No.: WO2009/027340
PCT Pub. Date: Mar. 5, 2009

(65) Prior Publication Data
US 2011/0108072 A1    May 12, 2011

(30) Foreign Application Priority Data
Aug. 31, 2007  (DE) .................... 10 2007 041 309

(51) Int. Cl.
*D06B 15/00* (2006.01)

(52) U.S. Cl. .......................... 68/208; 134/186
(58) Field of Classification Search .............. 68/208; 134/186
See application file for complete search history.

(56) References Cited

U.S. PATENT DOCUMENTS

| | | | | |
|---|---|---|---|---|
| 2,054,797 A | * | 9/1936 | Franklin | 134/110 |
| 2,310,877 A | * | 2/1943 | Sperry | 285/14 |
| 2,813,543 A | * | 11/1957 | Todd | 137/513.3 |
| 5,201,553 A | * | 4/1993 | Grisham | 285/148.23 |
| 6,189,550 B1 | | 2/2001 | Stickel et al. | |
| 7,396,050 B2 | | 7/2008 | Marioni | |
| 2003/0127855 A1 | * | 7/2003 | Heverly | 285/227 |
| 2008/0168769 A1 | | 7/2008 | Preimesberger et al. | |

FOREIGN PATENT DOCUMENTS

| | | | |
|---|---|---|---|
| DE | 273737 | | 5/1914 |
| DE | 1802090 | | 5/1969 |
| DE | 3310226 A1 | | 10/1984 |
| DE | 38 05 605 | * | 9/1989 |
| JP | 11-151398 | * | 6/1999 |
| JP | 2002-018188 | * | 2/2002 |
| JP | 2006-322515 | * | 11/2006 |

* cited by examiner

*Primary Examiner* — Frankie L Stinson
(74) *Attorney, Agent, or Firm* — James E. Howard; Andre Pallapies

(57) ABSTRACT

A water-conducting domestic appliance having a connector, a neck, and a connecting element that has at least one section formed by elastic material and an insertion end, wherein the connecting element connects the connector to the neck. A supporting ring is arranged at the insertion end, and the connecting element has an insertion region with an insertion rounding on the insertion end, wherein the insertion rounding runs tangentially into a sealing region.

20 Claims, 2 Drawing Sheets

HYDRAULIC CONNECTING ELEMENT OF A WATER-CONDUCTING DOMESTIC APPLIANCE

BACKGROUND OF THE INVENTION

The invention relates to a water-conducting domestic appliance.

Water-conducting domestic appliances have among other things a connecting element for a pressure-tight connection of hydraulic components, which essentially consists of an elastic material and with which supporting rings are arranged at the regions of contact with the hydraulic components to be connected, ensuring a pressure-tight connection. The hydraulic components can be for example a connector of a pump for connection to a neck. The connecting element here is pushed onto one of the two hydraulic components or can be connected permanently to this. The second hydraulic component is then inserted into the connecting element.

Such a connecting element is described for example in patent specification DE 197 58 249 C2. The connecting element here is one made of elastic material between a pump connection and a further connection, for example a discharge neck of a container. The discharge neck encloses the elastic connecting element. It has at least one convolution, to prevent the transmission of vibrations and running noise to a significant extent. At the other end the connecting element encloses the pushed-in pump connection. The connections are held together in the contact region by supporting rings or hose clips. Axial insertion of the neck is required for correct fitting of the connecting element. This is often not possible for reasons of space.

BRIEF SUMMARY OF THE INVENTION

The object of the invention is therefore to provide a water-conducting domestic appliance which is simpler to fit.

According to the invention this object of the invention is achieved in that the connecting element has an insertion region and a sealing region behind this in the insertion direction. The sealing region is made up of a supporting ring and a sealing ring. The sealing ring and connecting element here consist of the same elastic material. The insertion region comprises an insertion rounding, which is rounded in such a manner that the rounding runs tangentially into the sealing region. This causes the neck to be forced into the coaxial position even when inserted or pushed on at an angle. It is in principle immaterial here whether the neck is inserted into the connecting element or pushed over it in an enclosing manner. The invention is therefore based on the principle of directing the neck into the correct position during fitting. Even when positioned on the connecting element at an angle, it does not skew and it does not slide off the connecting element but is forced into the desired position by the insertion region as insertion into or positioning over the connecting element continues.

According to one advantageous embodiment of the invention the sealing region has an inner sealing ring and an outer supporting ring. The neck is thus inserted into the connecting element. In the insertion region the internal diameter decreases in the insertion direction. The inner sealing region provides better protection for its more sensitive material, which cannot therefore be easily damaged when the connecting element is being fitted.

According to a further advantageous embodiment of the invention in the region of the insertion rounding the connecting element consists essentially of a non-elastic material. It is connected permanently to the supporting ring in the sealing region or configured as a single piece with it. It is subject to loading when the neck is forced from an angled direction into a coaxial position with the connecting element. Reaching the end of the insertion region as it is pushed in, the neck already has the desired coaxial alignment. The neck is then pushed further in, to reach the sealing region. Only at this point is the elastic material subject to loading in the sealing region. As the neck is pushed in further, it is therefore protected against wrinkling to a significant extent.

According to a further advantageous embodiment of the invention the lengths of the sealing region and insertion region have a ratio of approximately 3 to 1. This gives an adequate insertion length for the coaxial alignment of the neck in relation to the required sealing length.

According to a further advantageous embodiment of the invention the length of the connecting element is greater than its diameter. This means that the connecting element, which is made of elastic material, can be bent reliably and without detriment. It can as a result be bent in particular so far in the direction of the neck that the axes of the connecting element and the neck correspond. This facilitates the bringing together of the connecting element and the neck considerably, even where space is restricted.

According to a further advantageous embodiment of the invention the diameter of the inner sealing ring decreases in the insertion direction. In other words the sealing ring forms a steep funnel. This also facilitates the fitting of the connecting neck as the sealing ring also acts in a centering manner. The further the connecting neck is inserted, the greater the contact force between the sealing ring and the connecting neck and the more effective the seal. The changing diameter of the sealing ring means that the connection can still be sealed even when there are quite large measurement tolerances between the connecting element and the connecting neck.

According to a further advantageous embodiment of the invention the insertion rounding is configured on an insertion lug and consists solely of the non-elastic material. It has a lower coefficient of friction than the elastic material. This simplifies the insertion of the connecting element and neck.

According to an alternative advantageous embodiment of the invention a relatively thin layer of the sealing ring extends over the insertion rounding at the front end of the insertion region in the insertion direction. This anchors the sealing ring to the insertion region. On the one hand this increases the frictional resistance at the insertion region. On the other hand it avoids an abrupt transition between a hard material at the insertion region and the soft material of the sealing region with a potential leading edge and the risk of the elastic material wrinkling. Instead a continuous transition from the insertion region to the sealing region results, so the sealing ring is only subject to the action of fitting forces in a central region, where they are barely able to bring about a change in the length of the sealing ring.

According to an alternative embodiment of the invention the sealing region has an outer sealing ring and an inner supporting ring. The principle described above can therefore be reversed, with the neck being fitted over the end of the connecting element. All the advantageous embodiments described above can be expediently configured.

BRIEF DESCRIPTION OF THE DRAWINGS

The principle of the invention is described in more detail below by way of example with reference to a drawing, in which.

DETAILED DESCRIPTION OF EXEMPLARY EMBODIMENTS OF THE PRESENT INVENTION

Figure 1A:
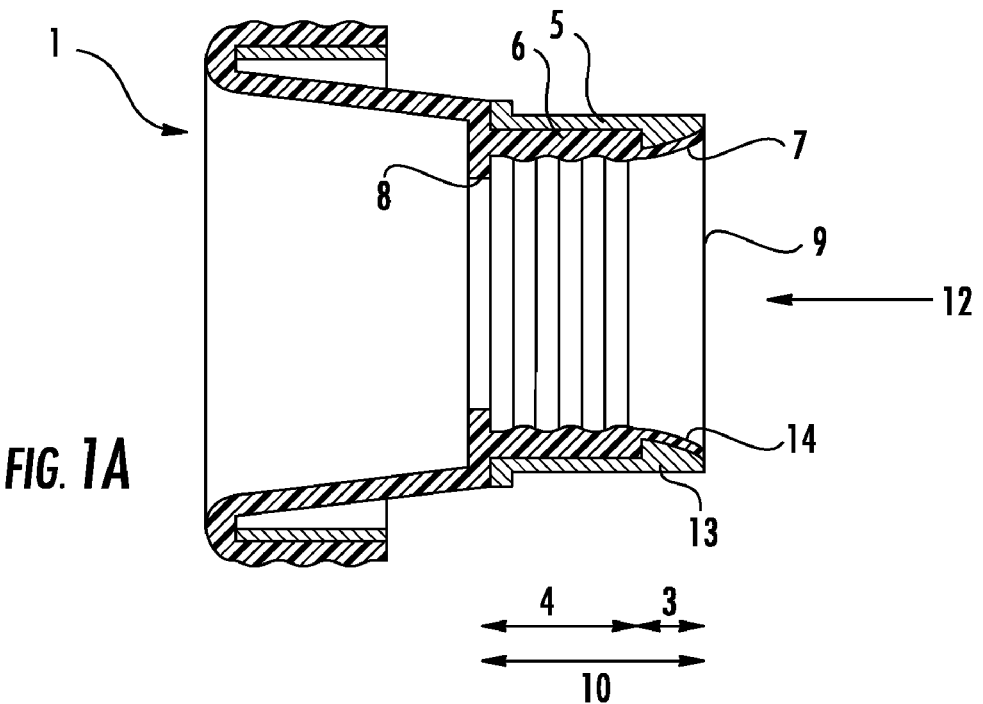
FIG. 1A shows a side view of a connecting element according to one embodiment of the invention.
Figure 1B:
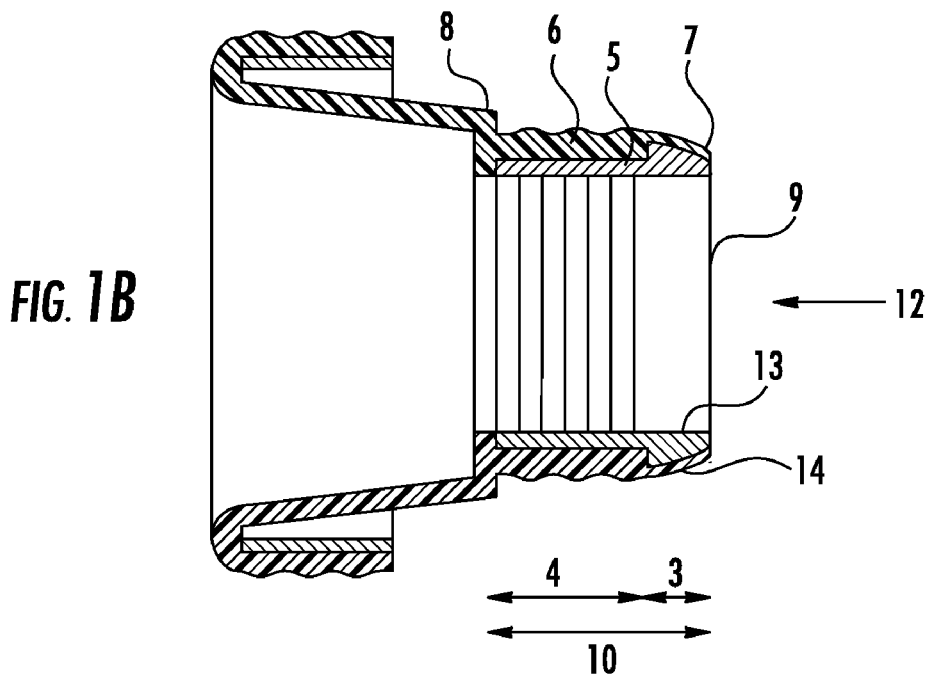
FIG. 1B shows a side view of a connecting element according to another embodiment of the invention.

FIG. 1 shows a connecting element 1 for the pressure-tight connection of two hydraulic components. These can be a pump connecting neck and a connector of a drain pan for example. The connecting element 1 essentially consists of an elastic material. The neck-side end 10 of the connecting element is made up of an insertion region 3 and a sealing region 4. Their length ratio is roughly a quarter to three quarters. The end 10 extends to a stop ring 8, which separates the neck-side end 10 from the remainder of the connecting element 1.

The insertion region 3, which is located on the outer neck-side edge 9 of the connecting element 1, comprises an insertion rounding 7. It is rounded in such a manner that it runs tangentially into a sealing ring 6. The internal diameter of the insertion region 3 therefore decreases over its entire length in the insertion direction 12. The insertion region 3 essentially consists of an insertion lug 13 made of a non-elastic material, which is covered with a thin layer 14 of elastic material on the inside of the connecting element 1.

The sealing region 4 is directly adjacent to the insertion region 3 in the insertion direction 12. It is made up of the inner sealing ring 6 and an outer supporting ring 5. The supporting ring 5 is thinner than the sealing ring 6 and consists of non-elastic material. In contrast the sealing ring 6 consists of the elastic material of the connecting element 1 and is produced as a single piece with this. The supporting ring 5 is connected in a non-displaceable manner to the sealing ring 6 and therefore to the connecting element 1 as a whole. The thin elastic layer 14 in the insertion region 3 anchors the sealing ring 6 additionally to the insertion region 3. The inside of the sealing ring 6 is configured in a corrugated manner in the insertion direction 12, to facilitate insertion of a neck 2 (FIG. 2) and yet still to ensure sealing contact between the sealing ring 6 and the neck 2.

Figure 2:
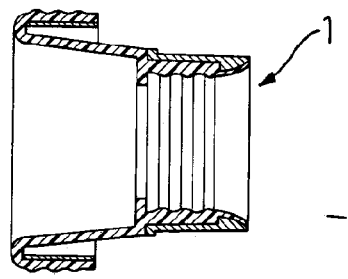
FIG. 2 shows the connecting element and a neck in an initial position and FIG. 3 shows the connecting element and the neck at the start of the insertion process.
Figure 2:
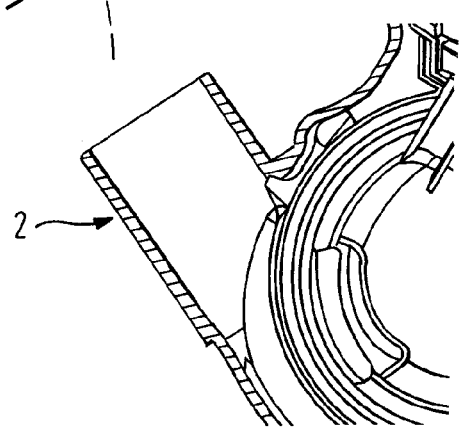

FIG. 2 shows the inventive connecting element 1 and a neck 2 of a pump that can be inserted at an angle. The entire connecting apparatus is arranged on the connecting element 1. The neck 2 of the pump is thus fitted without additional measures, such as the arrangement of a seal or a thread for example. The neck 2 here can be brought up to the connecting element from any direction. It is not necessary for the neck 2 to be inserted axially and centrally into the connecting element 1.

Figure 3:
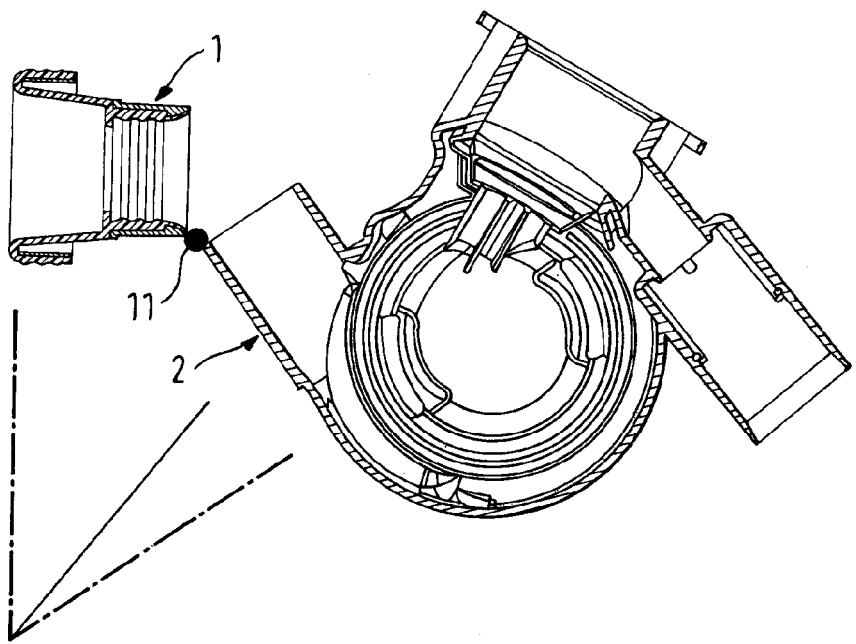

FIG. 3 shows the connecting element 1 and the neck 2 of the pump at the start of the insertion process. The neck 2 is rotated at an angle into the connecting element 1 by way of a contact point 11 between the neck 2 and the insertion region 3 of the connecting element 1. This may be necessary, if space conditions do not allow axial fitting. Where space conditions are very restricted, it is even possible to deform the connecting element 1 to some degree in the direction of the neck 2 to be inserted due to its elastic material, in order to bring the two elements to be connected together more easily. One side of the neck 2 now rests initially on the insertion rounding 7. The insertion lug 13 made of non-elastic material means that the neck-side edge 9 of the connecting element 1 cannot be deformed during fitting even when subject to pressure loading. As the neck 2 is inserted further into the connecting element 1, it is forced into a coaxial position with the neck-side end 10 by way of the insertion rounding 7 of the insertion region 3. Its opposite side therefore also rests on the insertion region 3 there. The neck 2 is now pushed over its entire periphery simultaneously into the sealing region 4 of the connecting element 1. This results in uniform loading of the sealing ring 6, protecting it against wrinkling. The thin layer 14 also helps, anchoring the sealing ring 6 firmly with or to the insertion lug 13.

LIST OF REFERENCE CHARACTERS

1 Connecting element
2 Neck
3 Insertion region
4 Sealing region
5 Supporting ring
6 Sealing ring
7 Insertion rounding
8 Stop ring
9 Neck-side edge
10 Neck-side end
11 Contact point
12 Insertion direction
13 Insertion lug
14 Thin layer

The invention claimed is:

1. A water-conducting domestic appliance, comprising:
a connector;
a neck;
a connecting element having an insertion end, the insertion end having a sealing region that is formed by elastic material and an insertion region adjacent to the sealing region, the connecting element to connect the connector to the neck; and
a supporting ring and sealing ring arranged at the insertion end;
wherein the insertion region comprises an insertion rounding, the insertion rounding comprising a non-elastic material and running tangentially into the sealing region.

2. The water-conducting domestic appliance of claim 1, wherein the water-conducting domestic appliance is one of a domestic dishwasher and a washing machine.

3. The water-conducting domestic appliance of claim 1, wherein the sealing region is formed at least by a sealing ring and the supporting ring.

4. The water-conducting domestic appliance of claim 3, wherein an inner diameter of the sealing ring decreases in an insertion direction.

5. The water-conducting domestic appliance of claim 3, wherein the sealing ring is drawn over the insertion rounding of the insertion region.

6. The water-conducting domestic appliance of claim 3, wherein, in an insertion direction, the sealing ring only starts after the insertion region.

7. The water-conducting domestic appliance of claim 3, wherein the sealing ring is outside, and wherein the supporting ring is inside.

8. The water-conducting domestic appliance of claim 1, wherein a first length of the insertion region and a second length of the sealing region has a ratio of three to one.

9. The water-conducting domestic appliance of claim 1, wherein a length of the connecting element is greater than a diameter of the connecting element.

10. The water-conducting domestic appliance of claim 1, wherein the sealing ring is inside, and wherein the supporting ring is outside.

11. The water-conducting domestic appliance of claim 1, wherein the insertion rounding comprises an insertion lug formed of substantially non-elastic material.

12. The water-conducting domestic appliance of claim 11, wherein the insertion lug comprises a layer of elastic material covering a surface of a portion of the insertion lug facing an interior region of the connecting element.

13. The water-conducting domestic appliance of claim 1, wherein the supporting ring is thinner than the sealing ring.

14. The water-conducting domestic appliance of claim 1, wherein the supporting ring is formed of a substantially non-elastic material.

15. The water-conducting domestic appliance of claim 1, wherein the sealing ring is formed of a substantially elastic material.

16. The water-conducting domestic appliance of claim 1, wherein the sealing ring is formed as one piece with the connecting element.

17. The water-conducting domestic appliance of claim 1, wherein the supporting ring is connected in a substantially non-displaceable manner to the sealing ring.

18. The water-conducting domestic appliance of claim 1, wherein a surface of the sealing ring facing an interior region of the connecting element is configured in a corrugated manner.

19. The water-conducting domestic appliance of claim 1, further comprising a stop ring formed at a distal end of the sealing region.

20. A connecting element for a water-conducting domestic appliance, the connecting element comprising:
- an insertion end having a sealing region formed by elastic material and an insertion region adjacent to the sealing region, wherein the insertion region comprises an insertion rounding, the insertion rounding comprising a non-elastic material and running tangentially into the sealing region;
- a support ring and sealing ring arranged at the insertion end; and
- wherein the connecting element is structured to connect a connector of the water-conducting domestic appliance with a neck of the water-conducting domestic appliance.

* * * * *